US012058950B2

(12) United States Patent
Freed et al.

(10) Patent No.: US 12,058,950 B2
(45) Date of Patent: *Aug. 13, 2024

(54) ADJUSTABLE FERTILIZER APPLICATION IMPLEMENT

(71) Applicant: AG FOCUS, LLC, Lexington, IL (US)

(72) Inventors: Bruce W. Freed, Lexington, IL (US);
Brian E. Freed, Lexington, IL (US)

(73) Assignee: AG FOCUS LLC, Lexington, IL (US)

( * ) Notice: Subject to any disclaimer, the term of this patent is extended or adjusted under 35 U.S.C. 154(b) by 75 days.

This patent is subject to a terminal disclaimer.

(21) Appl. No.: 17/881,769

(22) Filed: Aug. 5, 2022

(65) Prior Publication Data

US 2022/0369542 A1 Nov. 24, 2022

Related U.S. Application Data

(62) Division of application No. 16/418,949, filed on May 21, 2019, now Pat. No. 11,406,055.

(60) Provisional application No. 62/675,310, filed on May 23, 2018, provisional application No. 62/675,074, filed on May 22, 2018.

(51) Int. Cl.
*A01C 21/00* (2006.01)
*A01C 5/00* (2006.01)

(52) U.S. Cl.
CPC ............ *A01C 21/002* (2013.01); *A01C 5/00* (2013.01); *A01C 21/007* (2013.01)

(58) Field of Classification Search
CPC ....... A01C 21/002; A01C 5/00; A01C 21/007; A01C 21/00
See application file for complete search history.

(56) References Cited

U.S. PATENT DOCUMENTS

| 4,538,532 | A | * | 9/1985 | Coker | A01C 23/025 |
| | | | | | 172/166 |
| 4,628,840 | A | * | 12/1986 | Jacobson | A01C 23/025 |
| | | | | | 172/558 |
| 10,986,774 | B2 | * | 4/2021 | Freed | A01C 23/02 |
| 2011/0282556 | A1 | * | 11/2011 | Klenz | A01C 7/203 |
| | | | | | 701/50 |
| 2015/0373898 | A1 | * | 12/2015 | Audigie | A01C 7/04 |
| | | | | | 111/184 |
| 2016/0100520 | A1 | * | 4/2016 | Bassett | A01B 49/04 |
| | | | | | 172/27 |

* cited by examiner

*Primary Examiner* — Christopher J. Novosad
(74) *Attorney, Agent, or Firm* — William H. Honaker; Dickinson Wright PLLC

(57) ABSTRACT

The present invention discloses an agricultural implement for applying fertilizer beneath the surface of the soil. The implement has a main frame for connecting the agricultural implement to agricultural equipment. A swing arm is pivotally connected to the main frame. An adjustable actuator interconnects the swing arm to the main frame to control the movement of the swing arm with respect to the main frame. A pair of discs are mounted to the free end of the swing arm for rotation with respect to the swing arm. The discs are offset mounted with respect to one another and are angled outwardly with respect to the direction of travel of the implement. The discs form grooves for receipt of fertilizer. Fertilizer tubes are mounted to the swing arms adjacent the discs. The fertilizer tubes deposit fertilizer in the grooves formed by the discs.

5 Claims, 3 Drawing Sheets

US 12,058,950 B2

ADJUSTABLE FERTILIZER APPLICATION IMPLEMENT

RELATED APPLICATIONS

This application is a divisional of U.S. application Ser. No. 16/418,949 filed on May 21, 2019, which claims benefit to U.S. Provisional Application No. 62/675,074 filed on May 22, 2018, and Provisional Application No. 62/675,310 filed on May 23, 2018, which are incorporated herein by reference in their entirety.

STATEMENT REGARDING FEDERALLY SPONSORED RESEARCH

NONE.

TECHNICAL FIELD

This invention relates generally to agricultural equipment and more specifically to a fertilizer application implement for applying fertilizer below the soil surface.

BACKGROUND OF THE INVENTION

As is well known, application of fertilizer to plants is critical to their healthy growth. Proper nutrition is essential for satisfactory crop growth and production. Fertilizer placement is an integral part of efficient crop management. "Correct placement often improves the efficiency by which plants take up nutrients and consequently encourages maximum yields of intensively managed agronomic crops. Correct fertilizer placement is especially critical for maximum crop yields under reduced tillage operations." (See University of Idaho College of Agriculture article by Robert L. Mahlar.)

Banding refers to placing nutrients below, above, on one side, or on both sides of the seed or seedlings at planting. In banding operations, a disc creates a furrow in the soil and a tube positioned in the furrow applies nutrients. After the crop is planted a subsurface banding treatment is called a side dress application.

Typically, fertilizer bands should be placed at least 2 inches away from the seed to prevent salt damage and ammonia toxicity. The more precise the application the better for plant health and growth. The problem is that soil conditions are not uniform due to for example weather, location and general conditioning. This makes accurate placement of fertilizer difficult because furrow forming discs are statically mounted; they cannot be adjusted during the fertilizer operation. The discs are preset and only move as a result of ground surface variations, not soil conditions. In other words, the depth of penetration of the furrow forming discs is not adjustable on the fly, resulting in varied depths and poor plant health and growth.

What is needed is a fertilizer application implement that can be adjusted to accommodate proper fertilizer placement depth in varying soil conditions. The present invention solves the above problems.

SUMMARY OF THE INVENTION

The present invention discloses an agricultural implement for applying fertilizer beneath the surface of the soil. The implement has a main frame for connecting the agricultural implement to agricultural equipment. A swing arm is pivotally connected to the main frame. An adjustable actuator interconnects the swing arm to the main frame to control the movement of the swing arm with respect to the main frame. The actuator can be adjusted for varying soil conditions or elevations, etc. The actuator can be adjusted from the cab of the agricultural equipment or at the implement.

A pair of discs are mounted to the free end of the swing arm for rotation with respect to the swing arm. The discs are offset mounted with respect to one another and are angled outwardly with respect to the direction of travel of the implement. The discs form grooves for receipt of fertilizer. Fertilizer tubes are mounted adjacent the discs and terminate near the ground engaging portion of the discs. The fertilizer tubes deposit fertilizer in the grooves formed by the discs. A furrow closer can be attached to the main frame to close the groove opened by the discs.

The disc of the preferred embodiment is concave and angled outwardly to squeeze the soil together to create a groove with a firm wall. The discs are offset to facilitate the flow of residue and prevent pinch points.

These and other features and advantages of this invention will become more apparent to those skilled in the art from the detailed description of a preferred embodiment. The drawings that accompany the detailed description are described below.

DETAILED DESCRIPTION OF A PREFERRED EMBODIMENT

Figure 1:
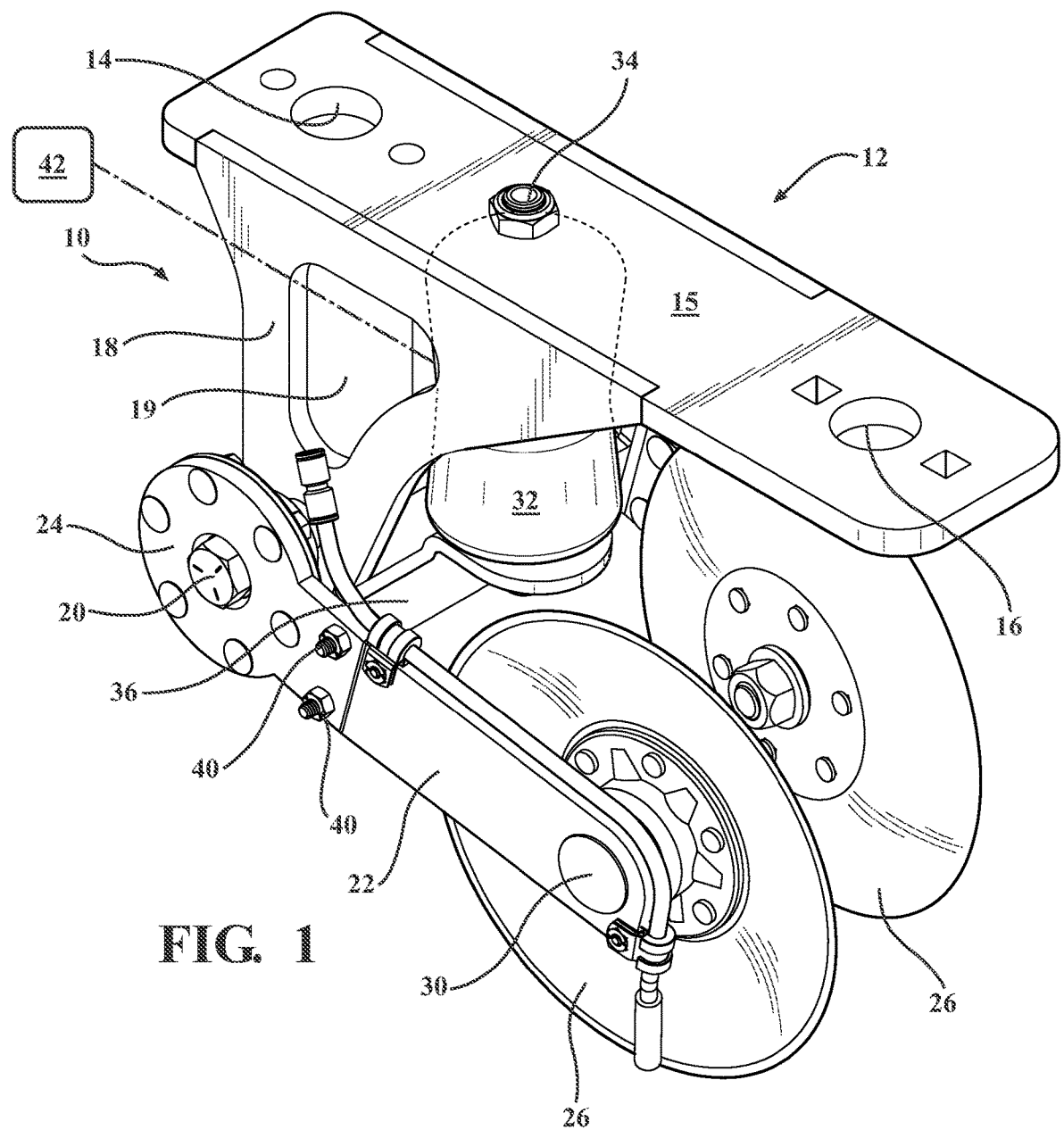
FIG. 1 is a perspective view of the adjustable fertilizer application implement of the present invention.
Figure 2:
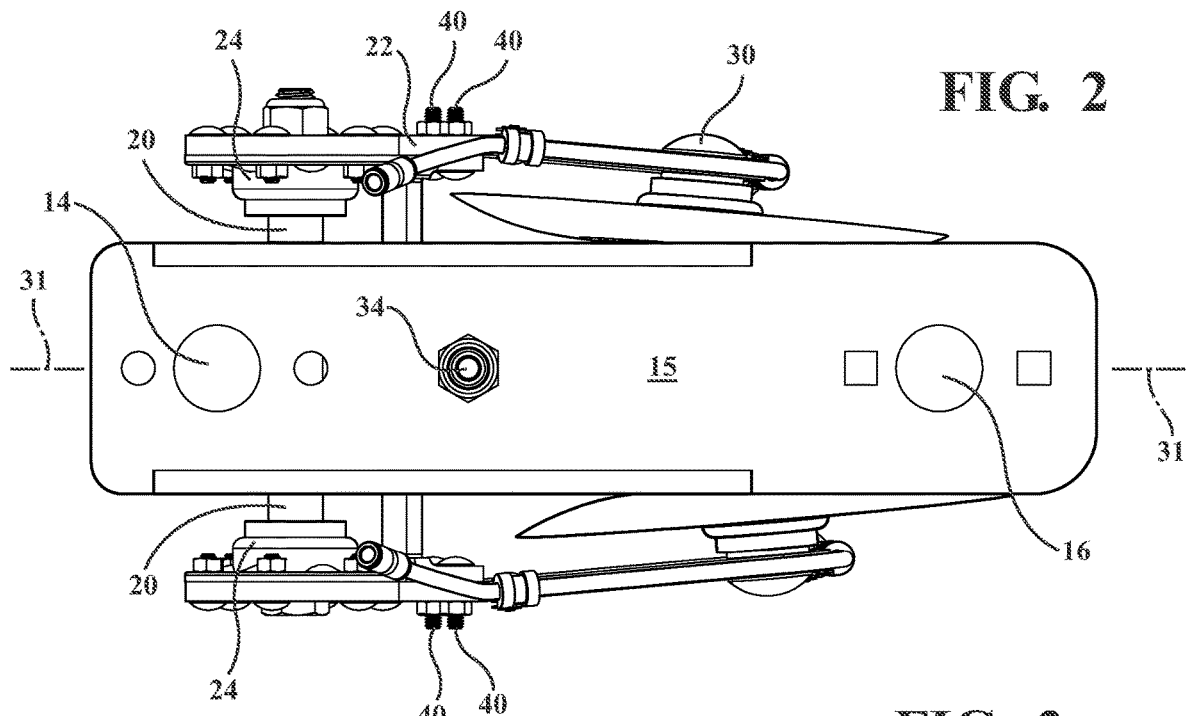
FIG. 2 is a top view of the adjustable fertilizer application implement of the present invention.
Figure 3:
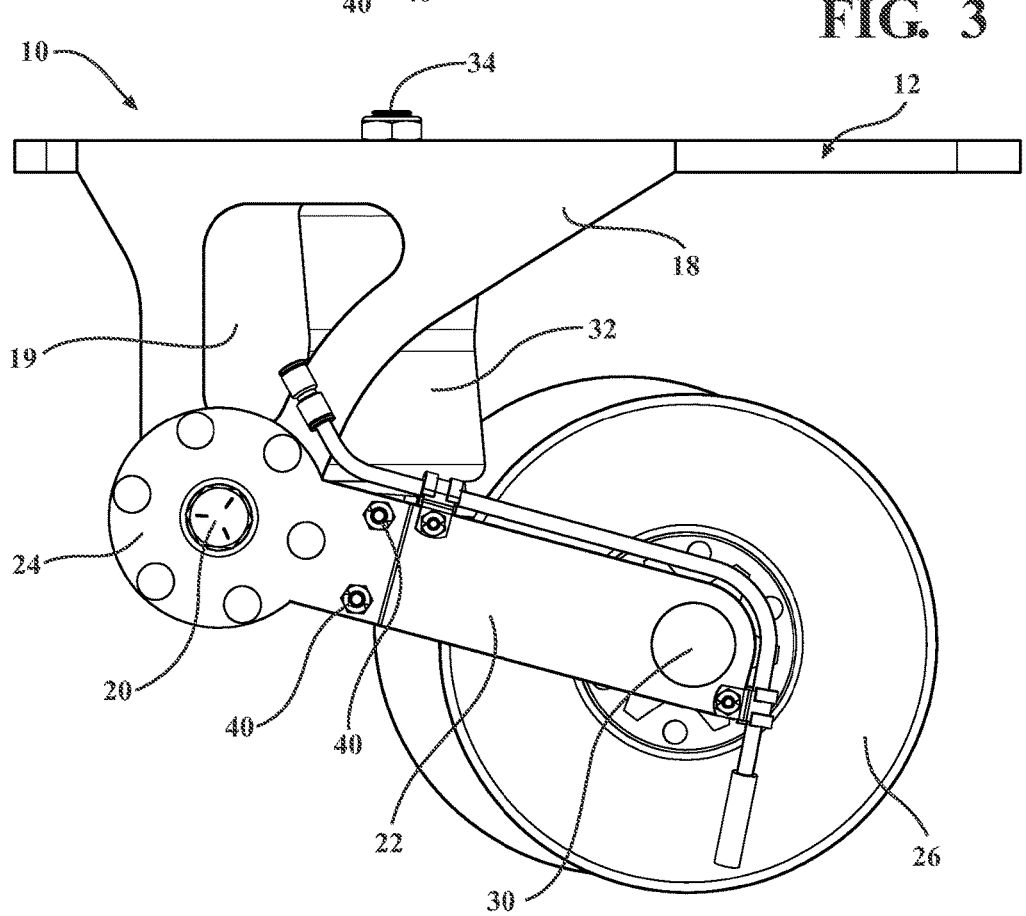
FIG. 3 is a side view of the adjustable fertilizer application implement of the present invention.
Figure 4:
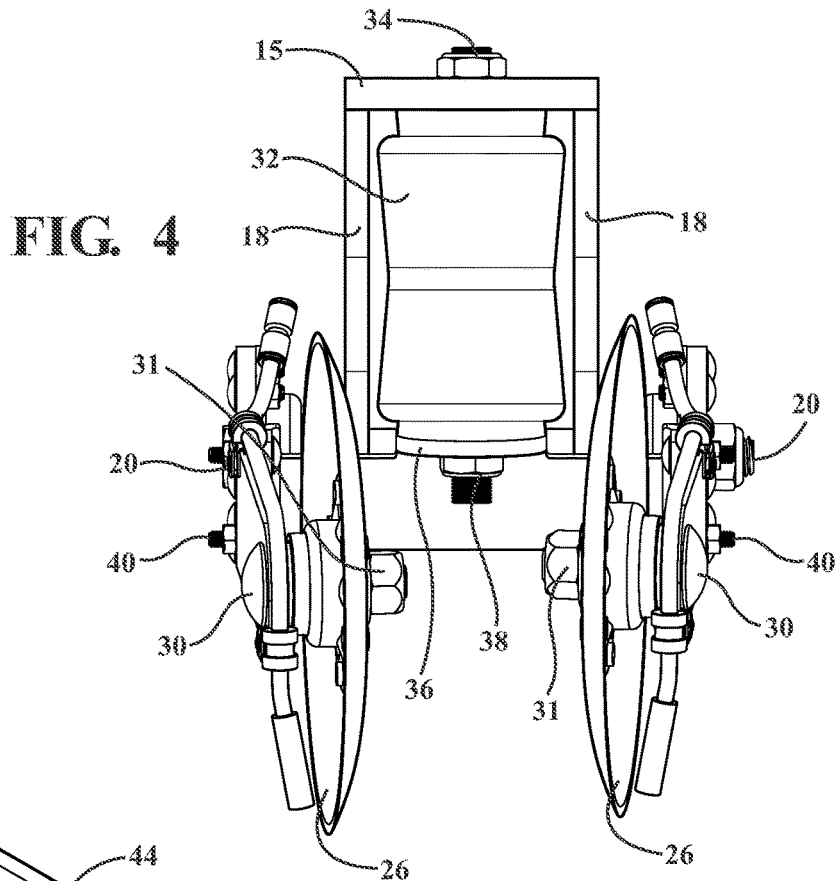
FIG. 4 is an end view of the adjustable fertilizer application implement of the present invention.

Generally shown in FIGS. 1 through 5 is the fertilizer application implement 10 of the present invention. The fertilizer application implement 10 has a body or main frame 12 for connecting the implement to agricultural equipment such as for example a seed planter. The main frame 12 as disclosed has a top plate 15 and bracket legs 18. In the disclosed embodiment, the legs 18 are welded to opposite sides of the top plate 15. Still further, in the disclosed embodiment, the legs 18 include side openings or cutouts 19 that reduce the material needed and the weight of the implement 10.

A first mount opening 14 is provided at the forward end of frame 12 to allow connection to a seeder, such as for example a low till seeder. A second mount opening 16 is provided at the rear end of the frame 12 to allow for the attachment of other implements, such as for example a furrow closer.

A first axle 20 extends from the lower end of each leg 18. Pivotally connected to each of the first axles 20 is a swing arm 22. A bearing 24 connects the swing arm 22 to each first axle 20.

Mounted at the free end of each swing arm 22 are discs 26. Discs 26 rotate about second axles 30. In the disclosed embodiment, the discs 26 are mounted to the free ends of each swing arm by a bearing 28 mounted upon each of the second axles 30 by a nut 31.

As illustrated, the discs 26 are each concave and offset in a direction parallel to the centerline 31. In addition, the discs 18 angle outwardly in the direction of travel with respect to the centerline 31, see FIG. 2.

An actuator 32 connects the swing arm 22 to the frame 12. The actuator 32 can be spring biased, hydraulic, electric, pneumatic, etc. The actuator 32 allows the position of the swing arm and thereby the discs 26 to be adjusted for a particular depth of penetration. As disclosed, the top of the actuator 32 is mounted to the top plate 15 through a bolt and nut 34 and the bottom is mounted to a bracket 36 by a bolt and nut 38. The bracket 36 extends between the pivot arms 22. In the disclosed embodiment, the bracket 36 is bolted to the arms 22 with bolts 40, but it will be understood that it could be welded, etc.

With reference to FIGS. 1 through 4, the actuator 32 is illustrated as an air bag. With the use of an air bag, the actuator 32 can be remotely operated to allow for adjustment of the actuator 32 for changing soil conditions. A remote-control unit 42 is schematically shown in FIG. 1. The remote-control unit 42 is operatively connected to the actuator for controlling the actuator from for example the cab of the agricultural equipment. In the disclosed embodiment, the actuator 32 is illustrated as a pneumatic actuator, but could be any type of actuator, for example hydraulic or electric.

Figure 5:
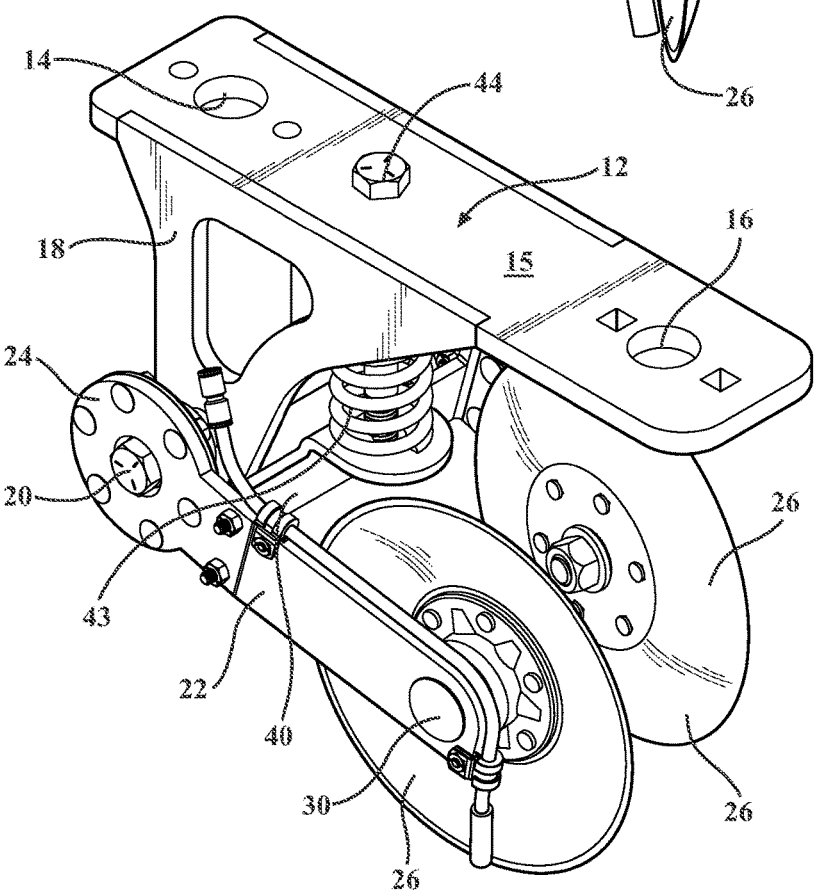
FIG. 5 is a perspective view of another embodiment of the adjustable fertilizer application implement of the present invention.

In FIG. 5, the actuator 32 is illustrated as a coil spring 43. This actuator is adjustable, but must be adjusted manually. The coil spring is held in position by a bolt 44 that extends through the top plate 15, the coil spring and the bracket 36. A nut (not shown) is threaded onto the free end the bolt 44. It will be understood that the nut could be welded to the bracket 36 to facilitate operation. By turning the bolt 44, the position of the discs 26 can be adjusted.

The discs 26 are concave to squeeze the soil together and create the fertilizer groove. Discs 26 are offset or stacked to facilitate the flow of residue and prevent pinch points. The actuator 24 controls the depth of the discs 26 and can be adjusted for different soil conditions to improve the application of fertilizer.

In the figures, the fertilizer tubes 46 are illustrated. The tubes 46 are mounted to the swing arms 22 by mounting brackets 48 and positioned closely adjacent the discs 26. In the disclosed embodiment, the free ends 50 of the tubes 46 are closely adjacent the lowest point of the discs 26. As will be appreciated by those of ordinary skill in the art, the tubes 46 are connected to a supply of fertilizer.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. An agricultural implement for applying fertilizer comprising:
    a main frame for connecting said agricultural implement to agricultural equipment for traveling in a direction of travel, said main frame having a centerline;
    a swing arm pivotally connected to said main frame, said swing arm having a free end;
    an adjustable actuator interconnecting said swing arm to said main frame to control the movement of said swing arm with respect to said main frame;
    at least one disc mounted to said free end of said swing arm for rotation with respect to said swing arm; said at least one disc is angled outwardly with respect to said direction of travel of said agricultural implement; said at least one disc forming a groove for the receipt of fertilizer;
    at least one fertilizer tube mounted adjacent said at least one disc, said at least one fertilizer tube terminating behind said at least one disc with respect to said direction of travel, said at least one fertilizer tube being adapted for depositing fertilizer in the groove formed by said at least one disc;
    whereby said at least one disc is angled outwardly to squeeze soil together to create a groove with a wall.

2. The agricultural implement of claim 1, wherein said adjustable actuator controls said at least one disc, said adjustable actuator can be adjusted for different soil conditions for the application of fertilizer.

3. The agricultural implement of claim 1, further including a remote control operatively connected to said actuator, wherein said actuator is controlled remotely to adjust said adjustable actuator for changing soil conditions.

4. The agricultural implement of claim 1, further including an opening for connecting an additional implement to said main frame.

5. The agricultural implement of claim 1, wherein said disc has a concave face.

* * * * *